US012770857B2

(12) United States Patent
Reese et al.

(10) Patent No.: US 12,770,857 B2
(45) Date of Patent: Oct. 20, 2026

(54) FORMATION OF LITHIUM FLUORIDE RICH PROTECTIVE ELECTRODE LAYERS USING ROLLER AND STATIC PRESSING

(71) Applicant: GM GLOBAL TECHNOLOGY OPERATIONS LLC, Detroit, MI (US)

(72) Inventors: Caleb Reese, Ferndale, MI (US); Sayed Youssef Sayed Nagy, Troy, MI (US); Joel G. Toner, Imlay City, MI (US); Jeffrey David Cain, Royal Oak, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 735 days.

(21) Appl. No.: 18/100,911

(22) Filed: Jan. 24, 2023

(65) Prior Publication Data

US 2024/0250234 A1 Jul. 25, 2024

(51) Int. Cl.

| | |
|---|---|
| ***H01M 4/04*** | (2006.01) |
| ***H01M 4/13*** | (2010.01) |
| ***H01M 4/38*** | (2006.01) |

(52) U.S. Cl.

CPC ....... *H01M 4/0435* (2013.01); *H01M 4/0407* (2013.01); *H01M 4/13* (2013.01); *H01M 4/382* (2013.01)

(58) Field of Classification Search

USPC .................................................... 72/462, 467

See application file for complete search history.

(56) References Cited

U.S. PATENT DOCUMENTS

| | | | | |
|---|---|---|---|---|
| 6,835,492 | B2 * | 12/2004 | Cho | H01M 4/1395 429/131 |
| 10,497,927 | B2 | 12/2019 | Xiao | |
| 11,217,781 | B2 | 1/2022 | Xiao | |
| 2019/0348668 | A1 * | 11/2019 | Kim | H01M 10/052 |
| 2023/0006211 | A1 * | 1/2023 | Lee | H01M 4/382 |
| 2024/0120469 | A1 * | 4/2024 | Kelly | H01M 4/366 |

FOREIGN PATENT DOCUMENTS

| | | | | |
|---|---|---|---|---|
| DE | 102018121026 A1 | | 2/2019 | |
| KR | 100413796 B1 | * | 12/2002 | H01M 4/139 |

OTHER PUBLICATIONS

English translate (KR100413796B1), retrieved date Jan. 20, 2026.*

Jansta, Jirí et al. “Electrochemical Corrosion of Polytetrafluourethylene Contacting Lithium Amalgam”. Electrochimica Acta, 1973, vol. 18, pp. 673-674. Pergamon Press. Printed in Great Britain; 2 pages.

German Office Action from counterpart DE1020231216449, dated Mar. 6, 2026.

* cited by examiner

*Primary Examiner* — Mohammed S. Alawadi

(57) ABSTRACT

A pressing machine includes pressing devices, actuators and a control module. At least one of the pressing devices includes a surface having a fluoropolymer material. At least one of the actuators is configured to adjust pressure of the pressing devices on one or more lithium foils, such that the surface presses against one of the one or more lithium foils to form a protective layer. The control module is configured to control the at least one of the actuators to adjust a parameter to control at least one of thickness of the protective layer and fluoride content of the protective layer.

17 Claims, 10 Drawing Sheets

FORMATION OF LITHIUM FLUORIDE RICH PROTECTIVE ELECTRODE LAYERS USING ROLLER AND STATIC PRESSING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to formation of electrodes for battery packs.

Battery packs of electric vehicles can include an arrangement of electrodes including anodes and cathodes separated by separation layers. The anodes and cathodes include substrates (or current collectors) with active material coatings. The substrates are typically in the form of aluminum or copper foil sheets, which are coated with, for example, an active material such as a lithium (Li) based material.

SUMMARY

A pressing machine is disclosed and includes pressing devices, actuators and a control module. At least one of the pressing devices includes a surface having a fluoropolymer material. At least one of the actuators is configured to adjust pressure of the pressing devices on one or more lithium foils, such that the surface presses against one of the one or more lithium foils to form a protective layer. The control module is configured to control the at least one of the actuators to adjust a parameter to control at least one of thickness of the protective layer and fluoride content of the protective layer.

In other features, the parameter is i) a rolling speed of the plurality of pressing devices, ii) the pressure of the plurality of pressing devices, or iii) a temperature of the one or more lithium foils.

In other features, the control module is configured to adjust at least one of i) rolling speed of the pressing devices, ii) the pressure of the pressing devices, iii) temperature of the pressing devices, and iv) temperature of the one or more lithium foils, to control the at least one of the thickness of the protective layer and the fluoride content of the protective layer.

In other features, the at least one of the pressing devices i) is at least partially wrapped with the fluoropolymer material, ii) includes an outer layer comprising the fluoropolymer material, iii) is formed of a fluoropolymer including the fluoropolymer material, or iv) is coated with a fluoropolymer lubricant including the fluoropolymer material.

In other features, the pressing devices include rollers.

In other features, the pressing devices include pressing plates.

In other features, the pressing devices are configured to laminate the one or more lithium foils on a current collector to form an electrode having the protective layer.

In other features, the LiF-rich coating system includes: the pressing machine and at least one material feeding device configured to feed the one or more lithium foils to the pressing devices.

In other features, the at least one material feeding device is configured to feed the fluoropolymer material to the pressing machine.

In other features, the at least one material feeding device is configured to feed a current collector to the pressing machine. The pressing machine is configured to laminate the one or more lithium foils on the current collector to form an electrode.

In other features, a method is provided and includes: providing at least one lithium foil; pressing the at least one lithium foil via at least one of multiple pressing devices to form a protective layer, the at least one of the pressing devices including a surface having a fluoropolymer material, and the fluoropolymer material reacting with a portion of the at least one lithium foil to form the protective layer including lithium fluoride; and laminating the at least one lithium foil on a current collector to form an electrode for a battery cell.

In other features, the at least one lithium foil is laminated on the current collector prior to forming the protective layer.

In other features, the at least one lithium foil is laminated on the current collector subsequent to forming the protective layer.

In other features, the method further includes pressing the at least one lithium foil via the pressing devices to form protective layers, where each of the pressing devices has a fluoropolymer material and reacts with a respective one of the at least one lithium foil to form a respective one of the protective layers.

In other features, the method further includes: adjusting pressure of the pressing devices on the at least one lithium foil, such that the surface presses against the at least one lithium foil to form the protective layer; and adjusting a parameter to control at least one of thickness of the protective layer and fluoride content of the protective layer.

In other features, the at least one of the pressing devices i) is at least partially wrapped with the fluoropolymer material, ii) includes an outer layer comprising the fluoropolymer material, iii) is formed of a fluoropolymer including the fluoropolymer material, or iv) is coated with a fluoropolymer lubricant including the fluoropolymer material.

In other features, the method further includes pressing the at least one lithium foil with two of the pressing devices prior to pressing the at least one lithium foil to form the protective layer.

In other features, the pressing devices include rollers.

In other features, the pressing devices include pressing plates.

In other features, the method further includes at least one of cleaning and regenerating the at least one of the pressing devices to provide a fresh non-reacted surface with fluoropolymer material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
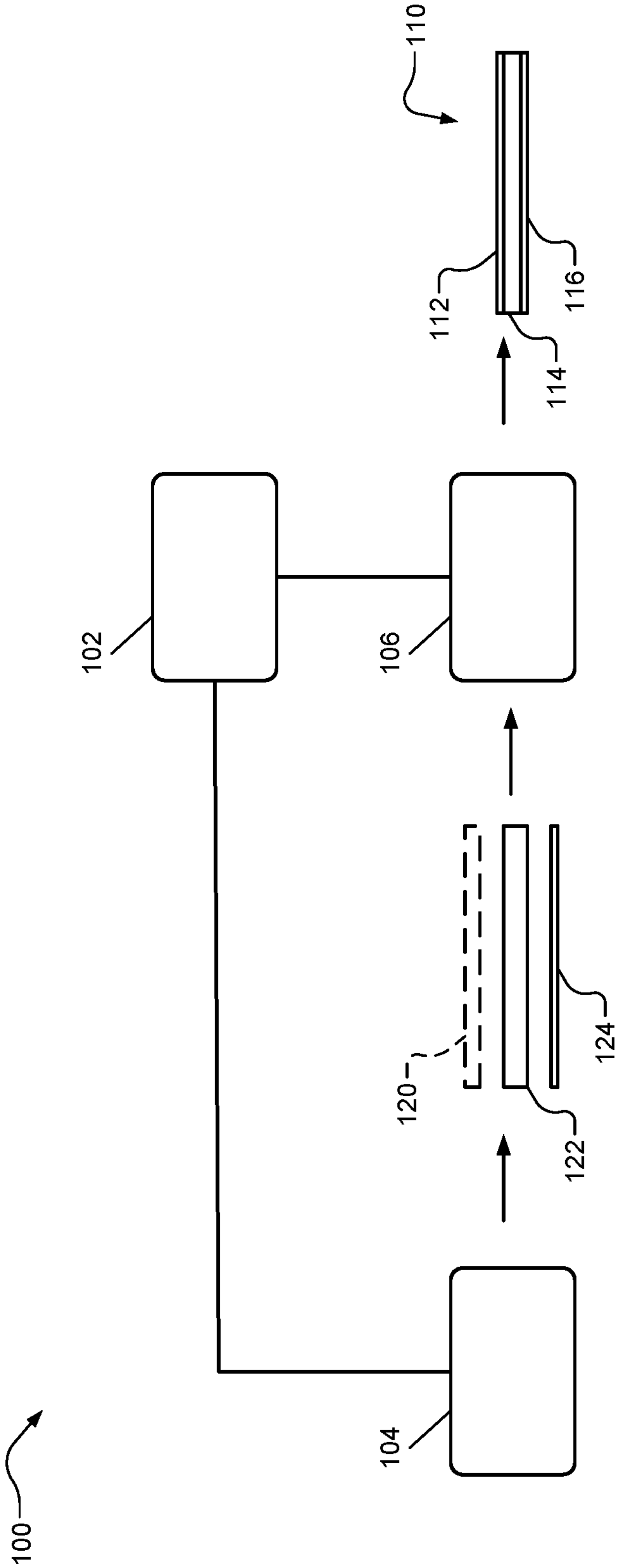
FIG. 1 is a functional block diagram of an example lithium fluoride rich coating system in accordance with the present disclosure.

During charging and discharging cycling of a battery pack, inhomogeneous lithium (Li) plating of Li metal anodes can occur, which can lead to dendritic growth and formation of "dead" Li material. Electrodes can be sensitive to air and have a high reactivity that leads to dendritic growth during cycling. Untreated Li foils are reactive with moisture in ambient air environments.

The examples set forth herein include formation of protective layers on electrodes (e.g., anodes and cathodes). The protective layers include fluorinated protective layers (or lithium fluoride (LiF)-rich) protective layers. The protective layers may be formed using roller-to-roller pressing or static pressing. Roller-to-roller pressing refers to the feeding of foils between two rollers to press the material of the foils to form protective layers. Static pressing refers to the use of a press without rollers to apply pressure on one or more layers to form protective layers.

The protective layers may be formed using fluoropolymer foils (or films), fluoropolymer wraps, fluoropolymer coated rollers, fluoropolymer coated pressing plates, rollers formed of fluoropolymer material, pressing plates formed of fluoropolymer material, fluoropolymer grease and/or other fluoropolymer lubricants, etc. These items may be formed of or include fluoropolymer material. The fluoropolymer material may include polytetrafluoroethylene (PTFE), polyvinylidene fluoride (PVDF), perfluoropolyether (PFPE), polyvinyl fluoride (PVF), polychlorotrifluoroethylene (PCTFE), perfluoro alkoxy alkane (PFA), fluorinated ethylene propylene (FEP), ethylene tetrafluoroethylene (ETFE), ethylene chlorotrifluoroethylene (ECTFE), and/or perfluoro elastomer (FFPM). A fluoropolymer foil (or wrap), a fluoropolymer device, and a fluoropolymer lubricant refer to a foil (or wrap), a device and a lubricant including at least one type of fluoropolymer.

The examples set forth herein include scalable methods for surface modification of i) Li metal foils and ii) electrodes including anodes and cathodes. In some embodiments, Li metal anodes are pressed with fluoropolymer material to form a protective coated anode. When Li and fluoropolymer material come into contact with sufficient force and/or temperature a solid-state reaction occurs (i.e., defluorination of the polymer), creating a LiF-rich coating on a Li surface. This allows for creating LiF-rich surface coatings on Li metal foils. Protective coatings are formed that include enriched LiF surfaces and/or outer layers. The solid-state reaction that occurs between the Li metal and fluoropolymer material may be represented according to equation 1. This process results in LiF-rich surfaces and/or outer layers and carbon. The carbon may remain as a matrix or component of the LiF-rich surfaces. The carbon may be cleaned away, discarded, recycled, etc., for example, using an etching and/or abrasion process.

$$(CF_2)_n + 2nLi \rightarrow nC + 2nLiF \quad (1)$$

The LiF surfaces and/or other layers have a high Li-ion surface diffusivity, high mechanical strength, and improved air stability of electrode in ambient environments, where moisture can be concerning. The protective coated electrodes improve lithium plating, such as during charging of a lithium metal battery, by lowering the Li nucleation overpotential and enabling more uniform Li growth.

FIG. 1 shows a LIF-rich coating system 100 that includes a control module 102, one or more material feeding devices 104, and a pressing machine 106. The control module 102 may control operation of the material feeding devices 104 and the pressing machine 106. The control module 102 may be separate from or included in the material pressing machine 106. The material feeding devices 104 may feed one or more fluoropolymer foils, one or more active material layer foils (or Li foils), one or more current collector foils (e.g., copper (Cu) foil(s)), and/or one or more electrodes to the pressing machine 106. Each electrode includes at least an active layer and a current collector. A lithium foil (or Li foil) may refer to a foil that is formed at least partially of lithium. In an embodiment, a Li foil is a foil formed entirely of lithium. In another embodiment, a Li foil is a foil formed partially of lithium. A non-lithium foil is a foil formed of a material that does not include lithium. Similarly, a fluoropolymer foil is a foil formed at least partially of a fluoropolymer. As another example, a current collector may be formed of aluminum and/or other suitable conductive material. The foils and/or electrodes fed to the pressing machines may be pressed individually or collectively, as further described below to provide a resultant stack of material layers 110 including a protective layer 112, an active (e.g., Li) layer 114, and a current collector (e.g., a Cu substrate layer) 116. The Li layer 114 may be formed at least partially of lithium.

As an example, a fluoropolymer foil 120, a Li foil 122, and a Cu foil 124 may be fed from the material feeding devices 104 to the pressing machine 106 and pressed together to provide the resultant stack 110. In other examples, the fluoropolymer material is introduced via rollers, press plates, and/or other fluoropolymer sources at the pressing machines. Other examples are described below and shown in FIGS. 3-5 and 8-10.

Figure 2:
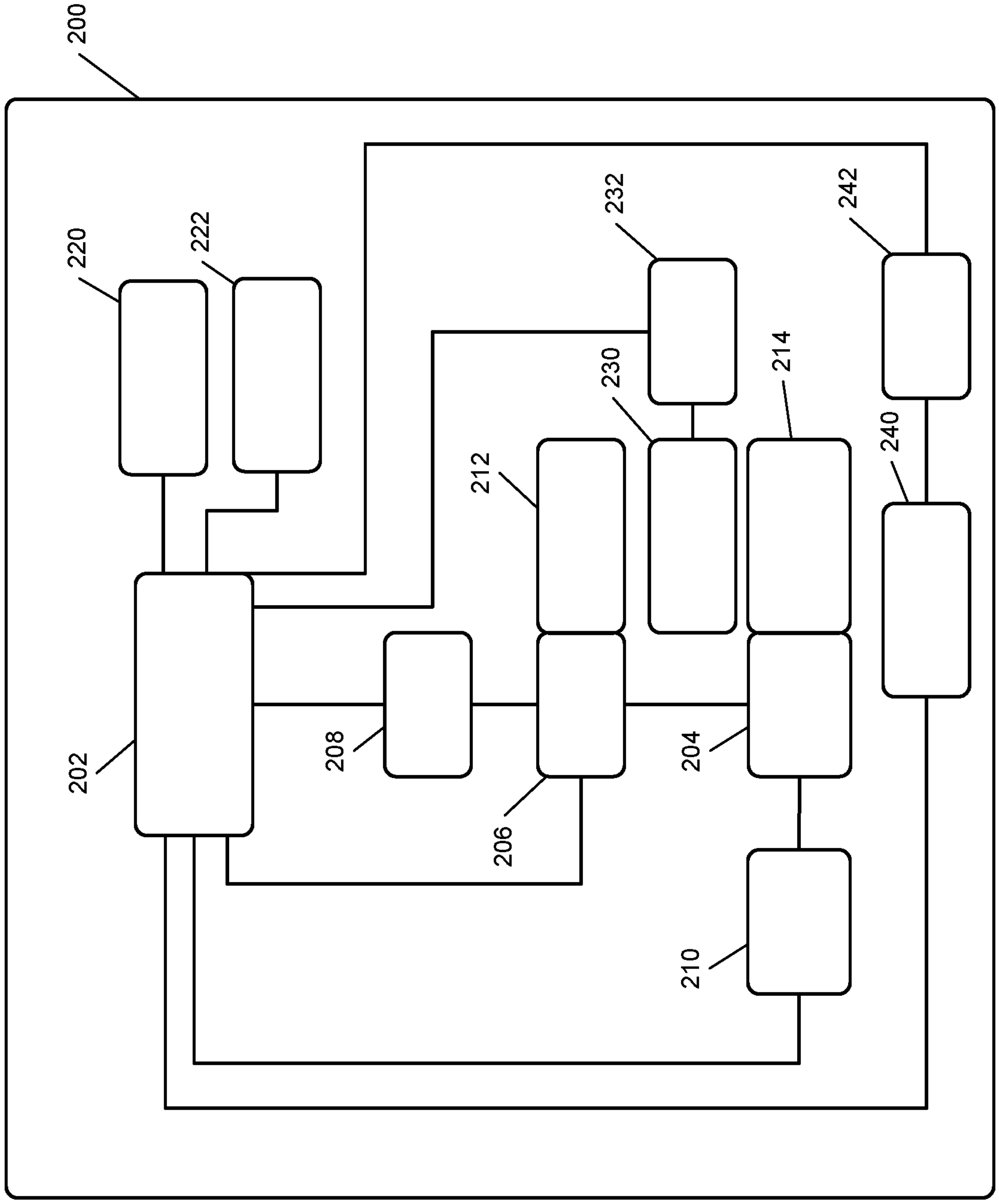
FIG. 2 is a functional block diagram of an example pressing machine in accordance with the present disclosure.
Figure 3:
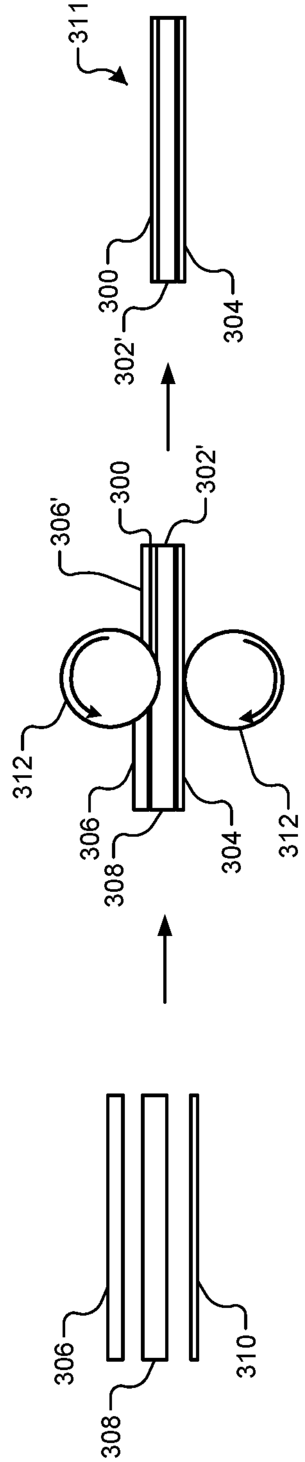
FIG. 3 is a diagram illustrating a rolling mill lamination process including formation of a protective coating on an active layer of a current collector in accordance with the present disclosure.
Figure 4:
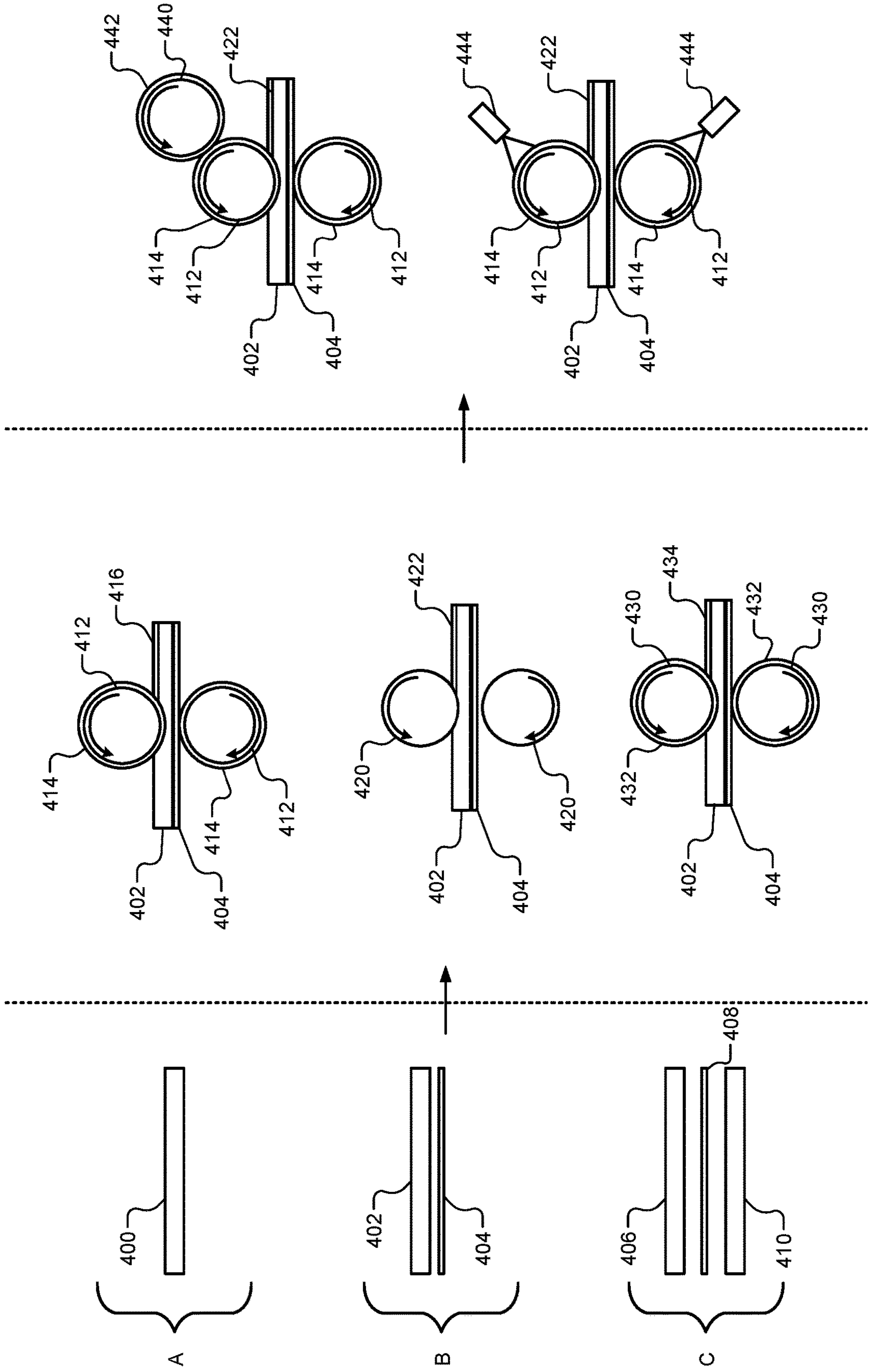
FIG. 4 is a diagram illustrating different methods of forming a protective coating on one or more active layers of a current collector using roller-to-roller pressing in accordance with the present disclosure.
Figure 5:
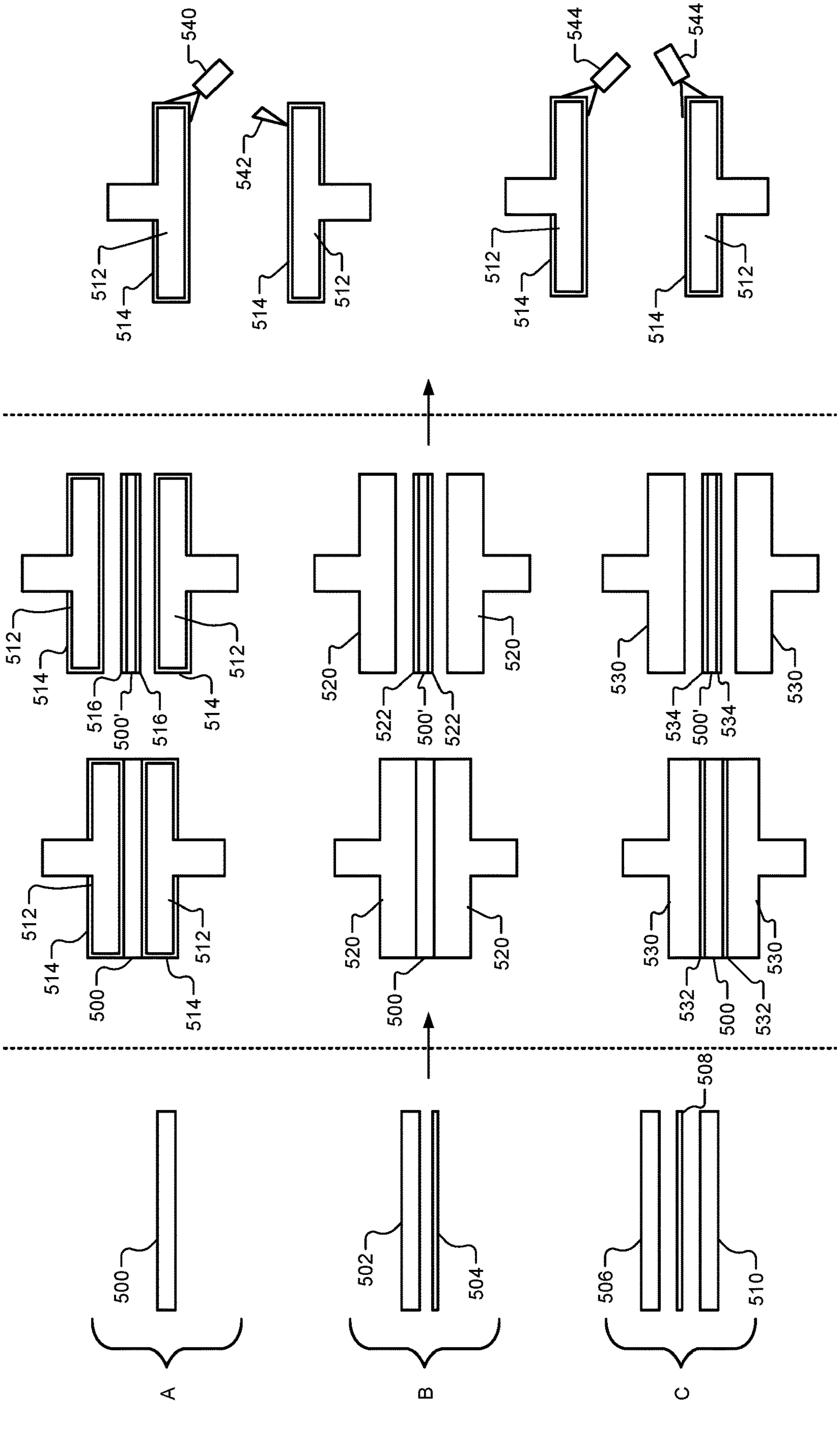
FIG. 5 is a diagram illustrating different methods of forming a protective coating on one or more active layers of a current collector using static pressing in accordance with the present disclosure.

FIG. 2 shows a pressing machine 200 that may include a control module 202, one or more sets of pressing devices 204, actuators 206, first motors 208, and second motors 210. One or more sets of pressing devices (e.g., pressing rollers or pressing plates) may each include a pair of pressing devices for pressing foils and/or electrodes. Additional pressing devices may be included for cleaning and/or regenerating the pressing devices. Examples of the stated pressing devices are shown in FIGS. 3-5.

The actuators 206 may be used to move the stated pressing devices including controlling pressure applied by the pressing devices against the material being pressed. For example, two opposing pressing devices, one on each side (upper side and lower side) of a stack of one or more layers may press in opposite direction to press the one or more layers between the pressing devices. This applied pressure may be adjusted by the control module 202 via the actuators 206 and the motors 208. The motors 208 may be included as part of the first actuators 206 and move elements of the actuators 206, which may include linkages, springs, screws, etc. for moving and adjusting opposing forces provided by opposing pressing devices. The second motors may be controlled to adjust speed of the pressing devices 204 when implemented as rollers. The pressures and speeds may be adjusted based on outputs of pressure sensors 212 and speed sensors 214 and predetermined target pressures and speeds.

The pressing machine may further include temperature sensors 220 and heaters 222. The temperature sensors 220 may detect ambient temperature, estimate temperature of the material being pressed, etc. The heaters 222 may be used to adjust temperature of the material being pressed.

The control module 202 may control the speed of pressing rollers, the pressure on the material being pressed, duration of pressing, contact time of pressing, temperatures of pressing rollers, temperature of pressing plates, and/or the temperature of the material to control: the thickness of the protective layer formed; the LiF density of the protective layer (or LiF mass per unit volume of the protective layer); the weight by volume ratio of LiF to other material; the mass by volume ratio of LiF to other material; etc. The slower the rotational speed of pressing rollers and/or the slower the line speed, the more time for a reaction to occur between fluoropolymer material and lithium foils and as a result the thicker the LiF layer(s) formed, and/or the higher the concentration of fluoride in the LiF layer(s). The longer the duration of pressing, the longer the contact time, the thicker the LiF layer(s) formed and/or the higher the concentration of fluoride in the LiF layer(s). The higher the temperature, the thicker the LiF layer(s) formed and/or the higher the concentration of fluoride in the LiF layer(s). As an example, the thickness of the protective layer being formed may be controlled to be 5-100 nanometers thick with a 20-70 at % fluoride content. As a few more examples, a rolling throughput speed may be 0.5-80 meters per minute (m/min), a pressure on the material being pressed may be 0.02-1 megapascal (MPa), a temperature of the material being pressed may be 20-170° C., and/or a contact time of pressing for the material being pressed may be 1-60 seconds.

The pressing machine 200 may further include scrapers 230 and second actuators 232. The scrapers 230 may be used to scrape pressing devices to remove fluoride depleted surfaces and/or outer layers of pressing devices. The second actuators 232 may be included to move and/or orient the scrapers 230 relative to the pressing devices.

The pressing machine 200 may further include cleaners 240 and third actuators 242. The cleaners 240 may be used to clean and/or regenerate pressing devices and/or to clean surfaces of LiF-rich protective layers. The cleaners 240 may introduce a chemical to etch fluoride depleted surfaces and/or outer layers of pressing devices. The actuators 242 may be used to move and/or orient the cleaners 240 relative to (i) the pressing devices, and/or ii) the resultant stack output from the pressing devices.

FIG. 3 shows a rolling mill lamination process including formation of a protective layer (or coating) 300 on an active layer 302 of a current collector 304. In the example shown, a fluoropolymer foil 306 is provided along with a Li foil 308 and a Cu foil 310 and stacked. A portion of the Li foil 308 becomes the active layer 302, which is laminated on the Cu foil 310. The Cu foil 310 becomes the current collector (or substrate) 304 of a resultant electrode 311. The stack of layers is fed between a pair of rollers 312. The rollers 312 apply pressure on the stack of layers and because of contact between the fluoropolymer foil 306 and the Li foil 308, the pressure applied and/or the set temperature, the fluoropolymer foil 306 reacts with the Li foil 308 to form the protective layer 300. A portion of the Li foil 308 is converted to the LiF-rich material of the protective layer 300. The remaining portion of the Li foil 308 is designated 302'. The portion of the fluoropolymer foil 306 that is not reacted with the Li foil 302 is designated 306'. The portion 306' may be removed, discarded, and/or recycled.

The fluoropolymer foil 306 may be pressed with the Li foil 308 using a different set of rollers than when the Li foil 308 is laminated on the Cu foil (or current collector) 310. The pressing of the fluoropolymer foil 306 to the Li foil 308 may be done using a similar laminating process as the lamination of the fluoropolymer foil 306 to the Li foil 308.

FIG. 4 shows different methods of forming a protective coating on one or more active layers of a current collector using roller-to-roller pressing. These methods may be referred to as lamination methods, which may begin, as a few examples, with i) a single Li foil 400, designated stack A, ii) a Li foil 402 and a current collector (e.g., Cu foil) 404, designated stack B, or iii) a first Li foil 406, a current collector (e.g., Cu foil) 408, and a second Li foil 410, designated stack C.

Stack A, B, or C may be fed between a pair of rollers 412 having an outer fluoropolymer film (or wrap) layers 414. In the example shown, stack B is shown being fed between the pair of rollers 412. The outer fluoropolymer film layers 414 react with a portion of the Li foil 402 to form protective (or LiF-rich) layer 416. The outer fluoropolymer film layers 414 may be disposable. If stack B is fed through the rollers 412, then one of the rollers 412 (e.g., the bottom one of the rollers 412) may not have a fluoropolymer film (or wrap). If stack B is fed through the rollers 420, then one of the rollers 420 (e.g., the bottom one of the rollers 420) may not be formed of fluoropolymer material. If stack B is fed through the rollers 430, then one of the rollers 430 (e.g., the bottom one of the rollers 430) may not have an outer layer of fluoropolymer lubricant (or grease).

Stack A, B, or C may be fed between a pair of rollers 420 formed of a fluoropolymer material. Radially outer portions of the pairs of rollers 420 react with a portion of the Li foil(s) (e.g., Li foil 402) to form protective (or LiF-rich) layer(s) (e.g., protective layer 422). If stack A is pressed, the resultant Li foil with protective layer may be subsequently laminated on a current collector. This may include pressing the resultant Li foil with protective layer using another pair of rollers. If stack C is pressed, two protective layers are formed, one on a top portion of the first Li foil and another on a bottom portion of the second Li foil.

Stack A, B, or C may be fed between a pair of rollers 430 having outer layers 432 of fluoropolymer lubricant (or grease). The outer layers 432 react with a portion of the Li foil 402 to form protective (or LiF-rich) layer 434.

By forming protective layers as described using rollers, the stated methods may be implemented during Li lamination processes (e.g., when laminating a current collector with Li is performed) including during roller-to-roller pressing operations.

Subsequent to forming one or more protective layers, non-reacted portion of the outer fluoropolymer film layers 414, fluoride (F) depleted portions of the rollers 420, and non-reacted portions of the outer layers 432 may be removed from and/or cleaned off of the rollers 412, 420, 430. This may be done i) using a roller 440 having an abrasive outer layer 442, ii) applying a chemical cleaning fluid to the rollers 412, 420, 430, or iii) performing another cleaning process. The chemical cleaning fluid may be introduced via cleaners 444 (e.g., the cleaners 240 of FIG. 2).

Subsequent to removing and/or cleaning the rollers 412, 420, 430, a regeneration process may be performed. This may include i) recovering the rollers 412 by reapplying a fresh fluoropolymer film (or wrap) on the rollers 412, and ii) reapplying a fluoropolymer lubricant (or grease) to the rollers 430. The cleaning of the rollers 420 regenerates the rollers 420 because the rollers 420 are formed of fluoropolymer material and the outer portion of the rollers 420 that is fluoride depleted has been removed. Between each lamination cycle using the rollers 420, the position of the rollers 420 relative to each other and/or the stack being fed into the rollers 420 may be adjusted to compensate for the portion of the rollers 420 that has been removed. For example, the rollers 420 may be moved closer to each other to compensate for a decrease in cross-sectional diameter of the rollers 420.

FIG. 5 shows different methods of forming a protective coating on one or more active layers of a current collector using static pressing. Each of these methods includes moving a stack of one or more layers into a press and applying pressure to the stack to form a protective layer. These methods may also be referred to as lamination methods, which may begin with i) a single Li foil 500, designated stack A, ii) a Li foil 502 and a current collector (e.g., Cu foil) 504, designated stack B, or iii) a first Li foil 506, a current collector (e.g., Cu foil) 508, and a second Li foil 510, designated stack C.

Stack A, B, or C may be provided between a pair of pressing plates 512 having an outer fluoropolymer film (or wrap) layers 514. In the example shown, stack A is shown being provided between the pair of pressing plates 512. The outer fluoropolymer film layers 514 react with portions of the Li foil 500 to form protective (or LiF-rich) layers 516. The non-reacted portion of the LI foil is designated 500'. The outer fluoropolymer film layers 514 may be disposable.

If stack B is provided to the pressing plates 512, then one of the pressing plates 512 (e.g., the bottom one of the pressing plates 512) may not have a fluoropolymer film (or wrap). If stack B is provided to the pressing plates 520, then one of the pressing plates 520 (e.g., the bottom one of the pressing plates 520) may not be formed of fluoropolymer material. If stack B is provided to the pressing plates 530, then one of the pressing plates 530 (e.g., the bottom one of the pressing plates 530) may not have an outer layer of fluoropolymer lubricant (or grease).

Stack A, B, or C may be fed between a pair of pressing plates 520 formed of a fluoropolymer material. Radially outer portions of the pairs of pressing plates 520 react with a portion of the Li foil(s) (e.g., Li foil 500) to form protective (or LiF-rich) layer(s) (e.g., protective layer 522). The non-reacted portion of the LI foil 500 is designated 500'.

If stack A is pressed, the resultant Li foil with protective layer(s) may be subsequently laminated on a current collector. This may include pressing the resultant Li foil with protective layers using another pair of rollers. If stack C is pressed, two protective layers are formed, one on a top portion of the first Li foil and another on a bottom portion of the second Li foil.

Stack A, B, or C may be provided to a pair of pressing plates 530 having outer layers 532 of fluoropolymer lubricant (or grease). The outer layers 532 react with a portion of the Li foil 500 to form protective (or LiF-rich) layers 534. The non-reacted portion of the Li foil 500 is designated 500'.

Although stack A is shown being pressed and two protective layers are shown as being formed, a single protective layer may be formed. For example, one of the pressing plates 512 may not have a fluoropolymer film (or wrap), one of the pressing plates 520 may not be formed of fluoropolymer material, and/or one of the pressing plates 530 may not include an outer fluoropolymer lubricant (or grease) layer.

Subsequent to forming one or more protective layers, non-reacted portions of the outer fluoropolymer film layers 514, fluoride (F) depleted portions of the pressing plates 520, and non-reacted portions of the outer layers 532 may be removed from and/or cleaned off of the pressing plates 512, 520, 530. This may be done i) using an abrasive cleaner, a grinder, or other abrasive device, which is designated 540 or a scraper 542, ii) applying a chemical cleaning fluid to the pressing plates 512, 520, 530 to, for example, perform a fluoroetch process, or iii) performing another cleaning process. The chemical cleaning fluid may be introduced via cleaners 544 (e.g., the cleaners 240 of FIG. 2). Although a single abrasive device 540 and a single scraper 542 are shown, two abrasive devices (one for each pressing plate) or two scrapers (one for each pressing plate) may be used.

Subsequent to removing and/or cleaning the pressing plates 512, 520, 530, a regeneration process may be performed. This may include i) recovering the pressing plates 512 by reapplying a fluoropolymer film (or wrap) to the pressing plates 512, and ii) reapplying a fluoropolymer lubricant (or grease) to the pressing plates 530. The cleaning of the pressing plates 520 regenerates the pressing plates 520 because the pressing plates 520 are formed of fluoropolymer material and the outer portion of the pressing plates 520 that is fluoride depleted has been removed. Between each lamination cycle using the pressing plates 520, the position of the pressing plates 520 relative to each other and/or the stack being fed into the pressing plates 520 may be adjusted to compensate for the portion of the pressing plates 520 that has been removed. For example, the pressing plates 520 may be moved closer to each other to compensate for a decrease in height of the pressing plates 520. In another embodiment, the pressure applied is the controlling parameter such that the formation of the protective layer is independent of the positions of the pressing plates.

Figure 6:
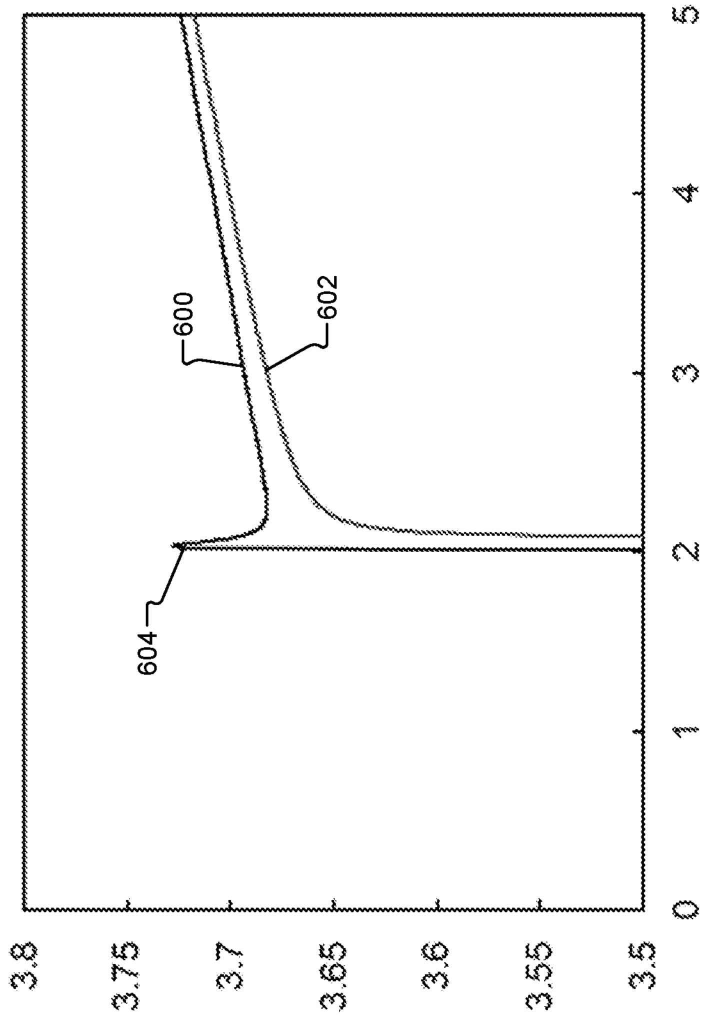
FIG. 6 is an example plot of voltage versus time illustrating differences in overpotential for an electrode without a protective coating and an electrode with a protective coating formed using the methods disclosed herein.

FIG. 6 shows a plot of voltage versus time illustrating differences in overpotential for an electrode without a protective coating and an electrode with a protective coating formed using the methods disclosed herein. The plot includes i) a first curve 600 of voltage versus time for an electrode (e.g., a Li anode) without a protective coating, and ii) a second curve 602 of voltage versus time for an electrode (e.g., a Li anode) with a protective coating as disclosed herein. The first curve 600 includes a spike 604 indicating a high overpotential. The second curve 602 is absent a spike and thus is associated with a lower overpotential. The lower overpotential signifies smoother more uniform plating of Li foil, as a result of the protective layer on Li foil.

Figure 7:
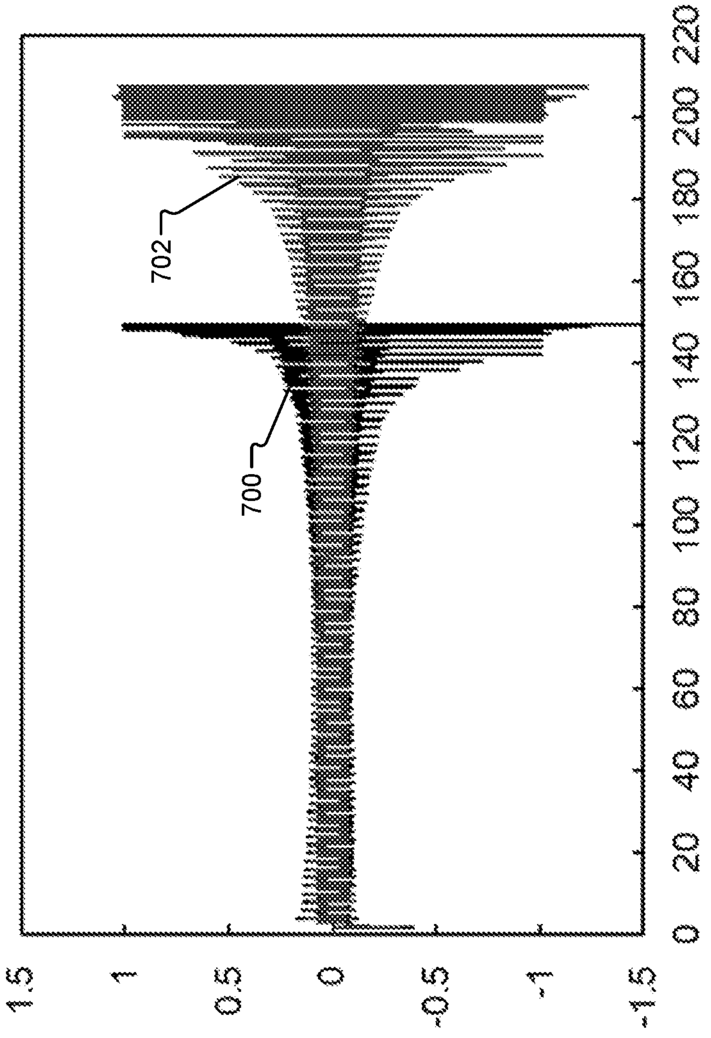
FIG. 7 is an example plot of voltage versus time illustrating differences in cycling stability between an electrode without a protective coating and an electrode with a protective coating formed using the methods disclosed herein.

FIG. 7 shows a plot of voltage versus time illustrating differences in cycling stability between an electrode without a protective coating and an electrode with a protective coating formed using the methods disclosed herein. The plot includes i) a first curve 700 of voltage versus time for a first electrode (e.g., a Li anode) without a protective coating, and ii) a second curve 702 of voltage versus time for a second electrode (e.g., a Li anode) with a protective coating. As shown, the second electrode with the protective coating experiences longer cycling stability than the first electrode without a protective coating.

Figure 8:
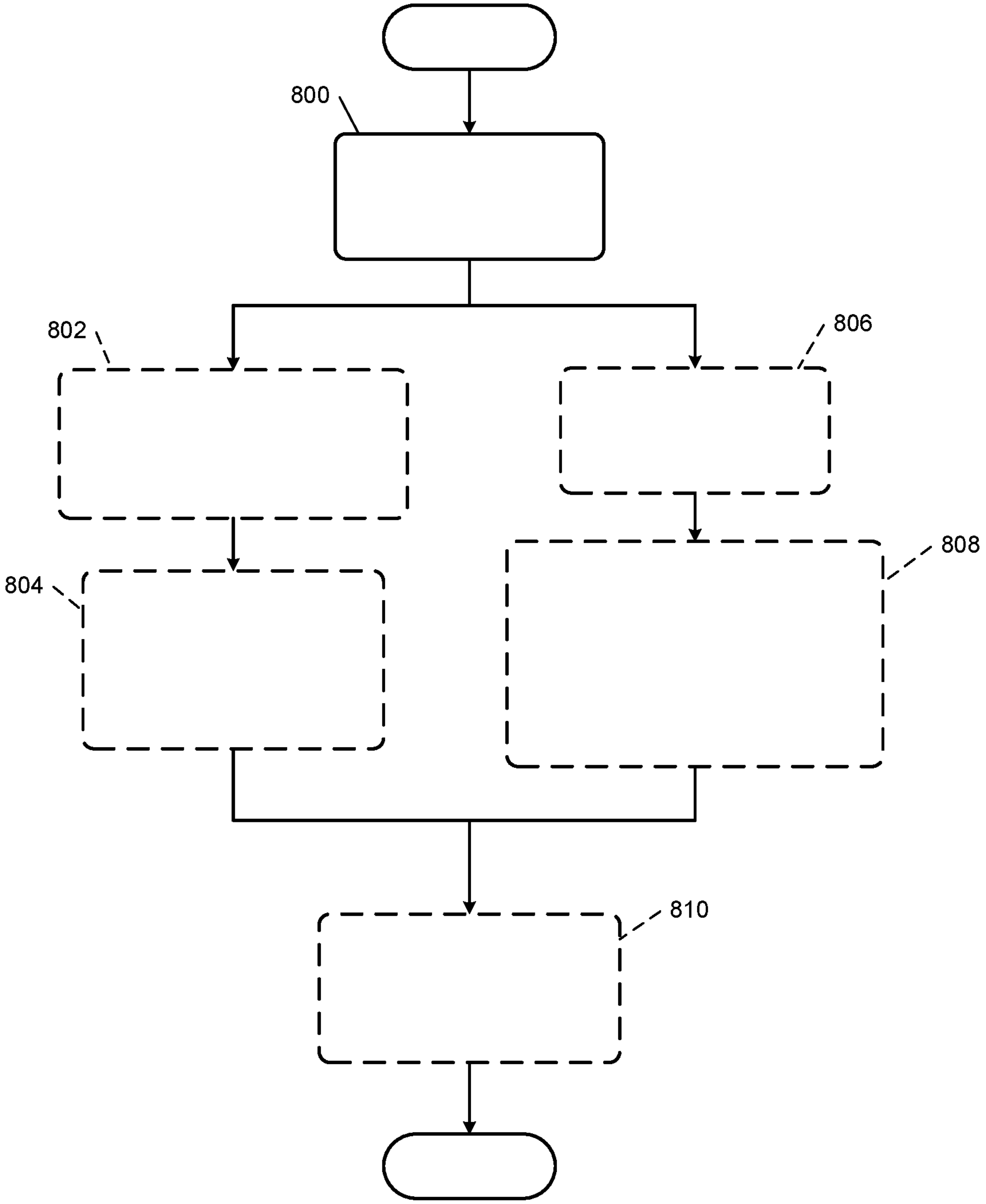
FIG. 8 illustrates a roller-to-roller pressing method in accordance with the present disclosure.

FIG. 8 shows a roller-to-roller pressing method. Operations 800, 802, 804, 806, 808, and 810 may be implemented by any of the pressing machines disclosed herein.

At 800, one or two foils (e.g., Li foil(s)) and separate current collector may be provided. One foil may be provided if a single side of the current collector is to be laminated. Two foils may be provided when two sides of the current collector are to be laminated.

Operations 802, 804 or operations 806, 808 may be performed depending on the application and layers being formed.

At 802, the foil(s) are fed to first set(s) of rollers of roller pressing machine to form protective layers on foil(s). The rollers may be fluoropolymer rollers or non-fluoropolymer (or standard) rollers. A pair of rollers may include two fluoropolymer rollers or one fluoropolymer roller and one non-fluoropolymer roller. A fluoropolymer roller may refer to a roller having an outer fluoropolymer layer, a roller formed of a fluoropolymer material, or a roller coated with fluoropolymer grease. A non-fluoropolymer roller refers to a roller that does not have an outer layer with fluoropolymer material, is not formed of fluoropolymer material, and/or is not coated with fluoropolymer lubricant (or grease).

At 804, the foil(s) with protective layer(s) are fed to second set(s) of rollers of the roller pressing machine to laminate a current collector and form a resultant electrode.

At 806, the foil(s) are fed to one or more sets of rollers to compress foil(s). This may be done for thickness reduction purposes. Non-fluoropolymer rollers may be used for this purpose.

At 808, the compressed foil(s) may be fed along with the current collector to one or more additional set(s) of rollers to form one or more protective layer(s) and to laminate the foil(s) to the current collector. This may include forming one or more protective layers and laminating one or two sides of the current collector.

At 810, the fluoropolymer rollers may be cleaned, scraped, rewrapped, relubricated (or regreased), etc. as described herein. The surface(s) of the fluoropolymer rollers that have at least partially reacted with lithium foil(s) may be dark (or black) in color due to the presence of carbon. The surface(s) and/or outer portion(s) of the fluoropolymer rollers can have a different composition than non-reacted portions of the fluoropolymer rollers and/or original non-reacted fluoropolymer rollers. The surface(s) may be cleaned, scraped, rewrapped and/or regreased to remove the reacted surface and/or portion of the fluoropolymer rollers to provide i) fresh, non-reacted, and/or regenerated layer(s) on the fluoropolymer rollers, and/or ii) fresh and/or non-reacted radially outer peripheral portion(s) of the fluoropolymer rollers for subsequent formation of LiF protective layer(s). Subsequent to 810, a cell may be assembled including the electrode.

Figure 9:
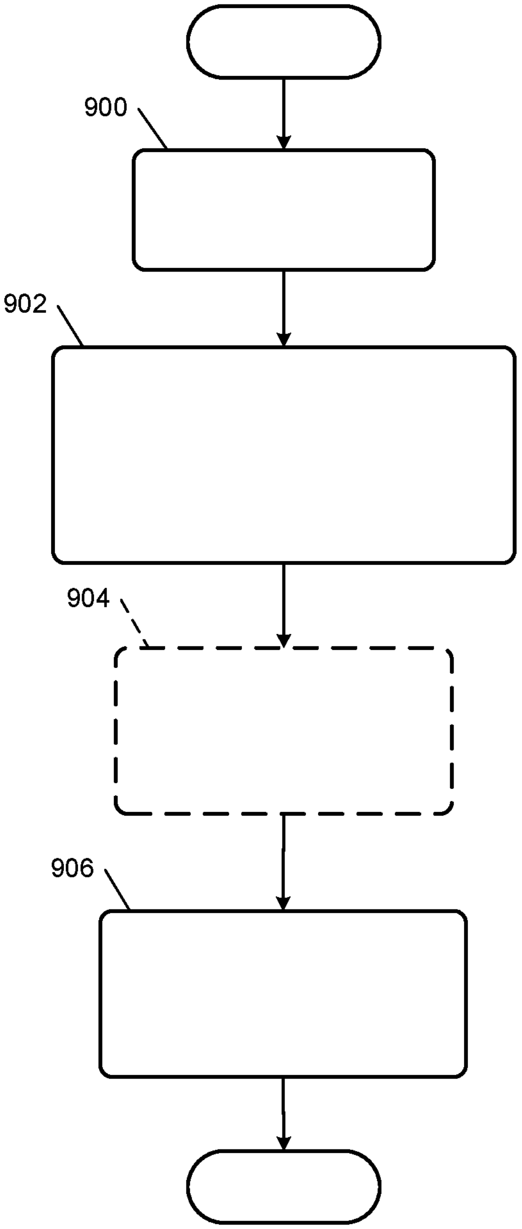
FIG. 9 illustrates a static pressing method including forming a protective layer prior to laminating an active layer on a current collector in accordance with the present disclosure.

FIG. 9 shows a static pressing method including forming a protective layer prior to laminating an active layer on a current collector. The pressing method may be implemented by any of the pressing machines disclosed herein.

At 900, one or two foils (e.g., Li foil(s)) and a current collector (or substrate) are provided.

At 902, the one or two foils are placed and pressed between one or two sets of platens (or pressing plates) to form protective layer(s) on the one or two foil(s). The platens may include i) two fluoropolymer coated platens (or fluoropolymer coated pressing plates), or ii) one fluoropolymer coated pressing plate and one non-fluoropolymer coated pressing plate. Portions of the foil(s) facing pressing surfaces of the pressing plates form the protective layers. If two foils are provided, each foil may be pressed separately to form one or two protective layer(s) on each foil. A protective layer may be formed on a single side of each foil or on two opposing sides of each foil. The two foils may be pressed together such that a single protective layer is formed on each foil.

At 904, one or more of the pressing plates may be cleaned, scraped, rewrapped, relubricated (or regreased), etc. as described herein. The surface(s) of the fluoropolymer pressing plates that have at least partially reacted with lithium foil(s) may be dark (or black) in color due to the presence of carbon. The surface(s) may be cleaned, scraped, rewrapped and/or regreased to remove the reacted surface and/or portion of the fluoropolymer pressing plates to provide i) fresh, non-reacted, and/or regenerated layer(s) on the fluoropolymer pressing plates, and/or ii) fresh and/or non-reacted outer peripheral portion(s) of the fluoropolymer pressing plates for subsequent formation of LiF protective layer(s).

At 906, the foil(s) with the protective layer(s) may be provided to another set of pressing plates and pressed to laminate the current collector. Subsequent to 906, a cell may be assembled including the electrode.

Figure 10:
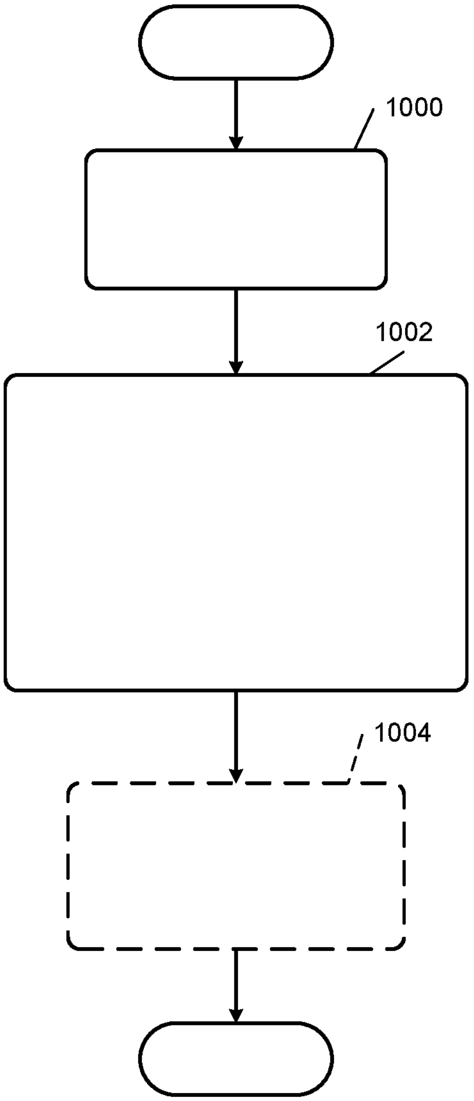
FIG. 10 illustrates a static pressing method including forming protective layer(s) while laminating active layer(s) on current collector(s) in accordance with the present disclosure.

FIG. 10 shows a static pressing method including forming one or more protective layers while laminating one or more active layers on a current collector.

The pressing method may be implemented by any of the pressing machines disclosed herein.

At 1000, provide current collector laminated with one or two foil(s) (e.g., Li foil(s)). A foil may be prelaminated on a first side of the current collector (or substrate). A second foil may be prelaminated on an opposing side of the current collector.

At 1002, the laminated current collector is set in and pressed by platens (or pressing plates) to form protective layer(s) on the one or two foil(s) to provide the resultant electrode. The platens may include i) two fluoropolymer coated platens (or fluoropolymer coated pressing plates), or ii) one fluoropolymer coated pressing plate and one non-fluoropolymer coated pressing plate. Portions of the foil(s) facing pressing surfaces of the pressing plates form the protective layers. A protective layer may be formed on a single side of each foil. Subsequent to 1002, a cell may be assembled including the electrode.

At 1004, one or more of the pressing plates may be cleaned, scraped, rewrapped, relubricated (or regreased), etc. as described herein, as described above for operation 904.

The example methods disclosed herein introduce fluoropolymer material to lithium foils and apply pressure to form fluorinated protective layers. This aids in improving cycling behavior of corresponding electrodes and can smooth lithium plating of current collectors, as well as improve electrode stability in air during manufacturing. The methods are applicable to both anode electrodes and cathode electrodes.

Figure 11:
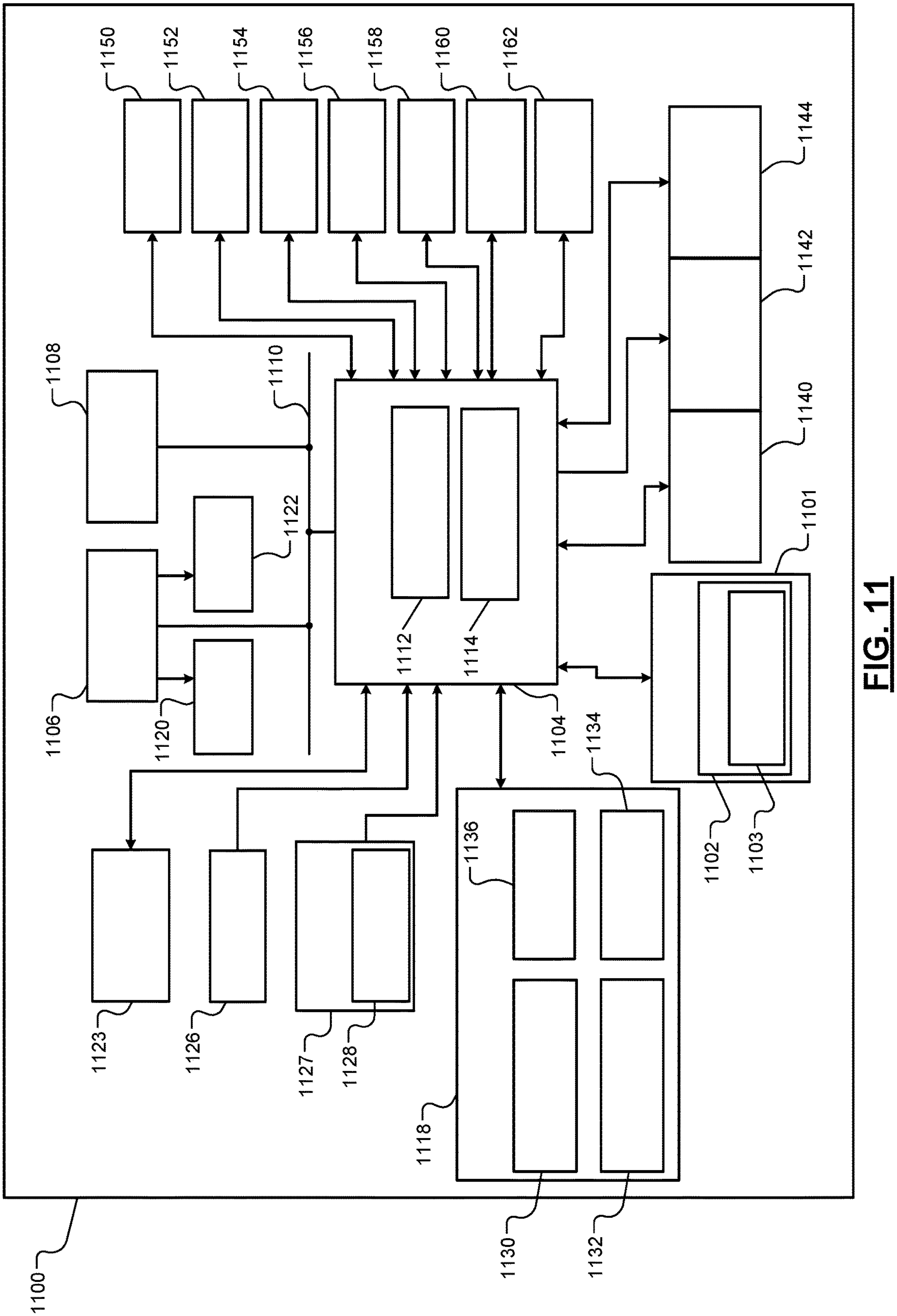
FIG. 11 is a functional block diagram of an example vehicle including a power source with electrodes having protective layers in accordance with the present disclosure.

FIG. 11 shows an example vehicle 1100 including a power source 1101 with cells 1102 having electrodes 1103 having protective layers. The protective layers may be formed as any of the protective layers disclosed herein. The protective layers may be LiF rich layers, as described above.

The vehicle 1100 may include a vehicle control module 1104, an infotainment module 1106 and other control modules 1108. The modules 1104, 1106, 1108 may communicate with each other via one or more buses 1110, such as a controller area network (CAN) bus and/or other suitable interfaces. The vehicle control module 1104 may control operation of vehicles systems. The vehicle control module 1104 may include a mode selection module 1112, a parameter adjustment module 1114, as well as other modules. The mode selection module 1112 may select a vehicle operating mode, such as one of the vehicle operating modes stated above. The parameter adjustment module 1114 may be used to adjust parameters of the vehicle 1100.

The vehicle 1100 may further include: a memory 1118; a display 1120; an audio system 1122; one or more transceivers 1123 including sensors 1126; and a navigation system 1127 including a global positioning system (GPS) receiver 1128.

The sensors 1126 may include sensors, cameras, objection detection sensors, temperature sensors, accelerometers, vehicle velocity sensor, and/or other sensors. The GPS receiver 1128 may provide vehicle velocity and/or direction (or heading) of the vehicle and/or global clock timing information.

The memory 1118 may store sensor data 1130 and/or vehicle parameters 1132, parameters 1134, and applications 1136. The applications 1136 may include applications executed by the modules 1104, 1106, 1108. Although the memory 1118 and the vehicle control module 1104 are shown as separate devices, the memory 1118 and the vehicle control module 1104 may be implemented as a single device.

The vehicle control module 1104 may control operation of an engine 1140, a converter/generator 1142, a transmission 1144, a window/door system 1150, a lighting system 1152, a seating system 1154, a mirror system 1156, a brake system 1158, electric motors 1160 and/or a steering system 1162 according to parameters set by the modules 1104, 1106, 1108. The vehicle control module 1104 may set some of the parameters based on signals received from the sensors 1126. The vehicle control module 1104 may receive power from the power source 1101, which may be provided to the engine 1140, the converter/generator 1142, the transmission 1144, the window/door system 1150, the lighting system 1152, the seating system 1154, the mirror system 1156, the brake system 1158, the electric motors 1160 and/or the steering system 1162, etc. Some of the vehicle control operations may include unlocking doors of the window/door system 1150, enabling fuel and spark of the engine 1140, starting the electric motors 1160, powering any of the systems 1150, 1152, 1154, 1156, 1158, 1162, and/or performing other operations as are further described herein.

The engine 1140, the converter/generator 1142, the transmission 1144, the window/door system 1150, the lighting system 1152, the seating system 1154, the mirror system 1156, the brake system 1158, the electric motors 1160 and/or the steering system 1162 may include actuators controlled by the vehicle control module 1104 to, for example, adjust fuel, spark, air flow, steering wheel angle, throttle position, pedal position, door locks, window position, seat angles, etc. This control may be based on the outputs of the sensors 1126, the navigation system 1127, the GPS receiver 1128 and the above-stated data and information stored in the memory 1118.

The vehicle control module 1104 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information, such as priority levels of source terminals of the power source 1101, power, current and voltage demands for each source terminal, etc. The vehicle control module 1104 may share this information and the vehicle operating mode with a control module of the power source 1101. The control module of the power source 1101 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The control module may determine connected configurations of the cells and corresponding switch states as described herein based on the parameters determined by the vehicle control module 1104 and/or the control module of the power source.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python@.

What is claimed is:

1. A pressing machine comprising:

a plurality of pressing devices, wherein at least one of the plurality of pressing devices comprises a surface having a fluoropolymer material;

a plurality of actuators, wherein at least one of the plurality of actuators being configured to adjust pressure of the plurality of pressing devices on one or more lithium foils, such that the surface presses against one of the one or more lithium foils to form a protective layer; and a control module configured to i) select a thickness, ii) select a concentration level of fluoride, iii) control the at least one of the plurality of actuators to adjust a first parameter to control a thickness of the protective layer and fluoride content of the protective layer such that the protective layer, subsequent to the pressing by the plurality of pressing devices, has the selected thickness and the selected concentration level of fluoride, and iv) control the plurality of actuators to adjust a plurality of parameters such that the protective layer, subsequent to the pressing of the plurality of pressing devices, has 20-70 at % fluoride content, wherein the plurality of parameters comprise the first parameter to control the thickness of the protective layer and the fluoride content of the protective layer.

2. The pressing machine of claim 1, wherein the first parameter is i) a rolling speed of the plurality of pressing devices, ii) the pressure of the plurality of pressing devices, or iii) a temperature of the one or more lithium foils.

3. The pressing machine of claim 1, wherein the control module is configured to adjust at least one of i) rolling speed of the plurality of pressing devices, ii) the pressure of the plurality of pressing devices, iii) a temperature of the pressing devices, and iv) a temperature of the one or more lithium foils, to control the at least one of the thickness of the protective layer and the fluoride content of the protective layer.

4. The pressing machine of claim 1, wherein the at least one of the plurality of pressing devices i) is at least partially wrapped with the fluoropolymer material, ii) comprises an outer layer comprising the fluoropolymer material, iii) is formed of a fluoropolymer including the fluoropolymer material, or iv) is coated with a fluoropolymer lubricant including the fluoropolymer material.

5. The pressing machine of claim 1, wherein the plurality of pressing devices comprise a plurality of rollers.

6. The pressing machine of claim 1, wherein the plurality of pressing devices comprise a plurality of pressing plates.

7. The pressing machine of claim 1, wherein the plurality of pressing devices are configured to laminate the one or more lithium foils on a current collector to form an electrode having the protective layer.

8. A LiF-rich coating system comprising:

the pressing machine of claim 1; and at least one material feeding device configured to feed the one or more lithium foils to the plurality of pressing devices.

9. The LiF-rich coating system of claim 8, wherein the at least one material feeding device is configured to feed the fluoropolymer material to the pressing machine.

10. The LiF-rich coating system of claim 8, wherein:

the at least one material feeding device is configured to feed a current collector to the pressing machine; and the pressing machine is configured to laminate the one or more lithium foils on the current collector to form an electrode.

11. A method comprising:

providing at least one lithium foil at a pressing machine, wherein the pressing machine comprises a plurality of pressing devices;

pressing the at least one lithium foil via at least one of the plurality of pressing devices to form a protective layer, the at least one of the plurality of pressing devices comprising a surface having a fluoropolymer material, and the fluoropolymer material reacting with a portion of the at least one lithium foil to form the protective layer comprising lithium fluoride;

selecting a thickness;

selecting a concentration level of fluoride;

controlling at least one of a plurality of actuators to adjust a first parameter to control a thickness of the protective layer and fluoride content of the protective layer such that the protective layer, subsequent to the pressing by the plurality of pressing devices, has the selected thickness and the selected concentration level of fluoride;

controlling the plurality of actuators to adjust a plurality of parameters such that the protective layer, subsequent to the pressing of the plurality of pressing devices, has 20-70at % fluoride content, wherein the plurality of parameters comprise the first parameter to control the thickness of the protective layer and the fluoride content of the protective layer; and laminating the at least one lithium foil on a current collector to form an electrode for a battery cell.

12. The method of claim 11, wherein the at least one lithium foil is laminated on the current collector prior to forming the protective layer.

13. The method of claim 11, wherein the at least one lithium foil is laminated on the current collector subsequent to forming the protective layer.

14. The method of claim 11, further comprising pressing the at least one lithium foil via the plurality of pressing devices to form a plurality of protective layers, wherein each of the plurality of pressing devices has a fluoropolymer material and reacts with a respective one of the at least one lithium foil to form a respective one of the plurality of protective layers.

15. The method of claim 11, further comprising adjusting pressure of the plurality of pressing devices on the at least one lithium foil via at least one of the plurality of actuators, such that the surface presses against the at least one lithium foil to form the protective layer.

16. The method of claim 11, wherein the at least one of the plurality of pressing devices i) is at least partially wrapped with the fluoropolymer material, ii) comprises an outer layer comprising the fluoropolymer material, iii) is formed of a fluoropolymer including the fluoropolymer material, or iv) is coated with a fluoropolymer lubricant including the fluoropolymer material.

17. The method of claim 11, further comprising pressing the at least one lithium foil with two of the plurality of pressing devices prior to pressing the at least one lithium foil to form the protective layer.

* * * * *